United States Patent
Färber

(10) Patent No.: US 6,382,713 B2
(45) Date of Patent: May 7, 2002

(54) DEVICE FOR ADJUSTING THE CRANK ELEMENT OF AN OPENABLE MOTOR VEHICLE ROOF

(75) Inventor: Manfred Färber, Wienlenbach (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/732,929

(22) Filed: Dec. 11, 2000

(30) Foreign Application Priority Data

Dec. 9, 1999 (DE) .......................... 199 59 542

(51) Int. Cl.⁷ ................................ B60J 7/047
(52) U.S. Cl. .................. 296/220.01; 296/223
(58) Field of Search ............ 296/220.01, 223

(56) References Cited

U.S. PATENT DOCUMENTS 5,897,160 A   4/1999   Reihl et al.

FOREIGN PATENT DOCUMENTS

| DE | 43 43 661 | 1/1995 |
|----|-----------|--------|
| DE | 44 15 235 | 9/1995 |
| DE | 195 14 585 | 10/1996 |

*Primary Examiner*—Dennis H. Pedder
(74) *Attorney, Agent, or Firm*—Nixon Peabody LLP; David S. Safran

(57) ABSTRACT

A device for adjusting a crank element of a openable motor vehicle roof, with a holding element which engages the crank element such that the crank element and the holding element can be moved relative to one another along a fin-like guideway on the crank element. The fin-like guideway is surrounded by a slide element which is formed on the holding element whereby the slide element can be rotated with respect to the holding element around an axis which is perpendicular to the plane in which the crank element and the holding element move.

24 Claims, 3 Drawing Sheets

DEVICE FOR ADJUSTING THE CRANK ELEMENT OF AN OPENABLE MOTOR VEHICLE ROOF

BACKGROUND OF THE INVENTION

1. Field of the Invention

This invention relates generally to a device for adjusting the crank element of an openable motor vehicle roof such as a louvered roof. In particular, the invention relates to a device for adjusting the crank element of an openable motor vehicle roof and includes a holding element which engages the crank element such that the crank element and the holding element can be moved relative to one another along a fin-like guideway on the crank element. The fin-like guideway is surrounded by a slide element which is formed on the holding element whereby the slide element can be rotated with respect to the holding element around an axis which is perpendicular to the plane in which the crank element and the holding element move.

2. Description of the Related Art

One such generic device is known for example from Published German Patent Application DE 195 14 585 A1, wherein a crank element is attached laterally to the cover of a sliding and lifting roof, and a holding element movably guided by the crank element in the lengthwise direction of the roof in order to adjust the cover via the crank element. The guideway of the crank element is made on the bottom of the crank element and in the transverse direction of the roof projects to either side with reference to the crank element in the manner of a fin, so that the guideway overall forms a T-shaped structure which fits into the slide element with the wide end. The slide element can be moved with respect to the holding element in the crosswise direction of the roof in order to compensate for tolerances. The defect is the complex configuration of the slide element.

German Patent DE 44 15 235 C1 discloses a similar device in which a crank element does not end on a fin-like guideway, but extends farther down, the slide element surrounding the guideway which is formed on either side of the crank element and surrounding the area of the crank element which extends down from the guideway. The slide element is stationary with respect to the holding element which is movably guided in the lengthwise direction of the roof.

U.S. Pat. No. 5,897,160 the disclosure of which is hereby incorproated by reference discloses a louvered roof in which mounting elements for adjacent louvers engage one another for relative adjustment to one another by a crank pin securely mounted on one mounting element, fitting into a curved crank slot or crank channel which is made on the other mounting element. The disadvantage to this guide system is that production tolerances easily lead to bad running of the system.

German Patent DE 43 43 661 C1 discloses a sliding and lifting roof in which there is a raising lever for a rotary latch having a cylindrical middle part and a lengthwise slot located over it and is pivotally supported on the raising lever by means of a cylindrical middle part in a corresponding recess. The slot is provided to hold in a certain cover position a control part which is provided laterally on a cover rail mounted on the cover and in doing so projects in the transverse direction of the roof from the roof rail. The length of the control part corresponds to the length of the receiving slot of the rotary latch.

The disadvantage in each aforementioned device is that force is transferred only on a line-like support between the guideway and the slide element.

SUMMARY OF THE INVENTION

Accordingly, an object of the present invention is to overcome the aforementioned disadvantages of the prior art by devising a device for adjusting the crank element of an openable motor vehicle roof which is insensitive in its functionality to production tolerances.

In accordance to an aspect of the invention, it is advantageous that production tolerances in the guideway as a result of the fin-like execution have a less dramatic effect on the smoothness of operation of the system than in a channel-like execution of the guideway, and that force is applied more uniformly overall and the holding element and the crank element at the same path thicknesses can accommodate larger forces. Overall, a stable, low-wear adjustment mechanism which is less sensitive to tolerances is enabled.

Preferably, the holding element and the crank element are made on two succeeding side adjustment elements for a louvered roof. The slide element is preferably supported in a circular receiver in the holding element and is provided with a slot in which the guideway is guided. Feasibly the receiver for the slide element is provided with a slot which is wider than the slot of the slide element in order to allow relative rotation of the guideway. Preferably the slide element is made of plastic which is injected into the receiver.

Other aspects, properties, features, and advantages of this invention follow from the brief description of preferred embodiments below which are shown in the drawings.

DETAILED DESCRIPTION OF THE PREFERRED EMBODIMENT

Figure 1:
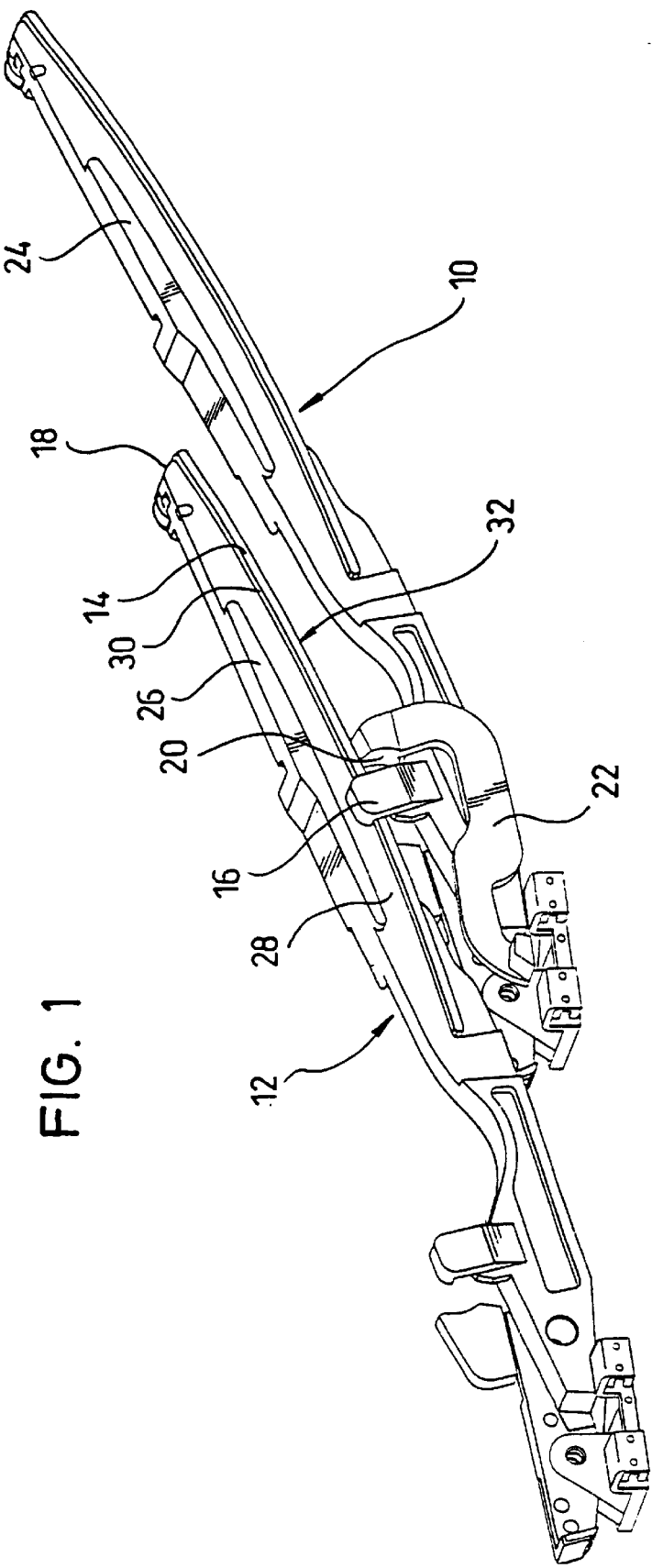
FIG. 1 shows a perspective view of the adjustment mechanism and two successive mounting elements of the louvered roof which engage one another.

Referring now to the drawings, FIG. 1 shows a view of two mounting elements 10, 12 which are each used as a side mounting for two louvers of a louvered roof (not shown) and which succeed one another in the lengthwise direction of the roof. The position of the mounting element 12 with respect to the lengthwise direction of the roof is located farther forward than the mounting element 10. This view is an intermediate position in which the louvered roof is opened and whereby the two mounting elements 10, 12 and the louvers attached thereto are swung out of their neutral position upward and are in part pushed on top of one another in the manner of a packet. In the closed position, the holding element 16 would be located on the rear, i.e. right end of a curved guideway 14, while in the completely opened position it would be located on the front, i.e. left end of the fin-like guideway 14.

Proceeding from the closed position in which the louvers are adjacent to one another and form a flat combination, adjacent mounting elements are coupled by force-fit to one another in the open direction first of all via a driver function (not shown). The advancing opening motion, however, causes the louvers to gradually swing out upward, this proceeding from the rearmost louver. Starting from a certain relative swing angle between the adjacent louvers, the driver function is released and the front mounting element 12 can then be moved along its guideway with respect to the rear mounting element 10. Conventionally, after the driver means (not shown) disengages, another driver function over a short section of the displacement path is maintained by the contact of the back end 18 of the front mounting element 12 with the corresponding contact surface 20 on the back end of a lock rocker 22. The entire rear area of the mounting elements 10, 12 forms one crank element 24, 26 at a time which is provided with a curved guideway 14 which projects fin-like from the side surface 28 and has two essentially plane contact surfaces 30, 32 which run parallel to one another and which engage the corresponding opposing surface 34, 36 which are formed on one slide element 38. The slide element 38 is pivotally mounted in the holding element 16 around an axis which is perpendicular to the plane in which both the holding element 16 and the crank element 26 move.

Figure 2:
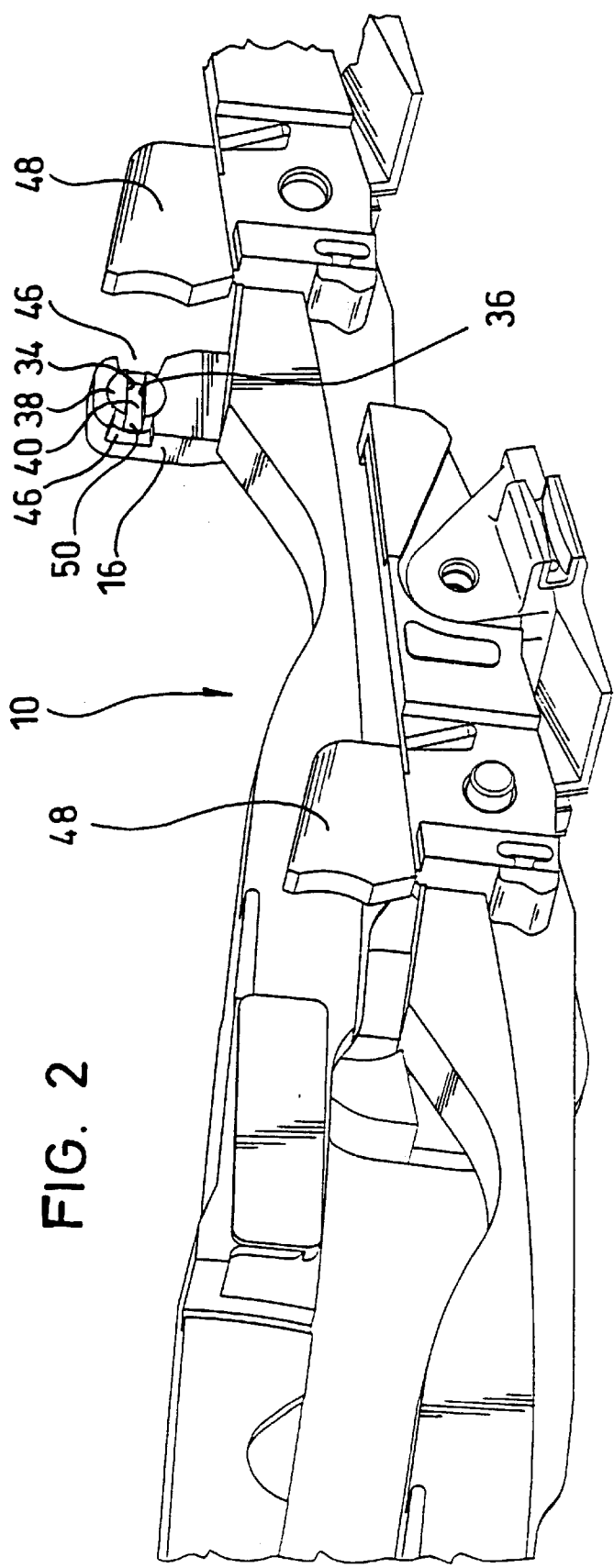
FIG. 2 shows an enlarged perspective view of the holding element of one mounting element from FIG. 1.
Figure 4:
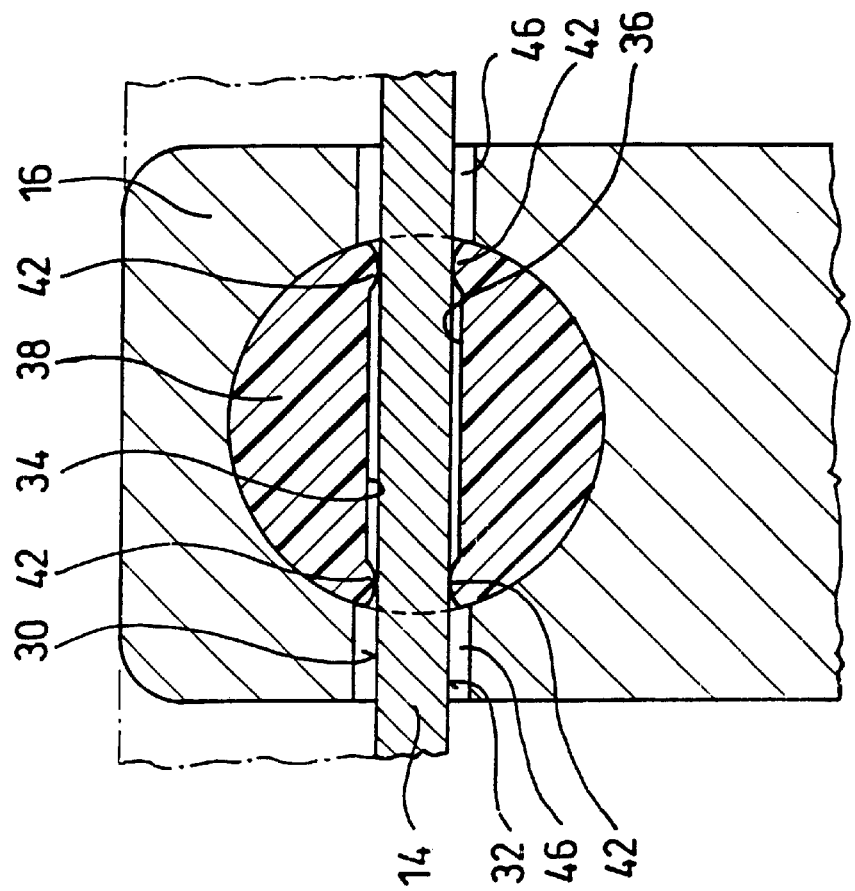
FIG. 4 shows a side view corresponding to FIG. 3.
Figure 3:
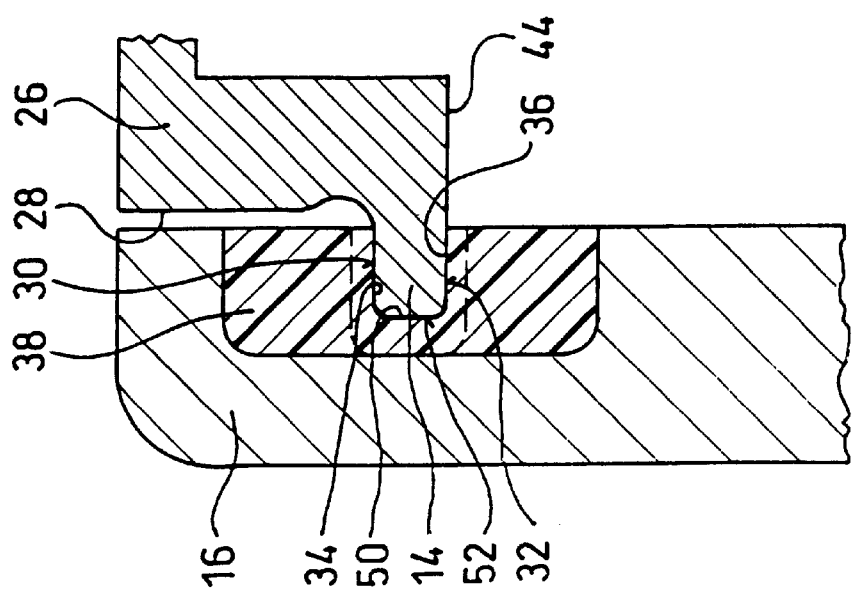
FIG. 3 shows a sectional view of the engagement area of the holding element and the guideway from FIG. 1.

As shown in FIGS. 2–4, the slide element 38 is made essentially cylindrical and is pivotally mounted in a corresponding circular receiver in the holding element 16. The contact surfaces 34, 36 are formed by a slot 40 by which the guideway or the guide fin 14 is guided to slide. The dimensions of the slot 40 are chosen such that the guide fin 14 in the vertical direction has no significant play. As shown in FIG. 4, the slot can be provided on both ends each with two opposing projections 42 which form the actual opposing surface for the contact surfaces 30, 32 of the guide fin 14. The crank element 26 is made such that the lower contact surface 32 of the guide fin 14 passes into the lower boundary surface 44 of the crank element 26, i.e. the guide fin 14 with the crank element 26 forms an L-shaped configuration, the guide fin 14 forming the short leg, i.e. the guide fin 14 is made only on one side of the crank element 26.

The holding element 16, i.e., the bearing shell for the slide element 38, is likewise provided with a slot 46 in the lengthwise direction of the roof which is wider than the slot 40 of the slide element 38 in order to allow rotation of the slide element 38 with the guide fin 14 routed through in a certain angular area. The lateral guidance, i.e., the guidance in the transverse direction of the roof, of the crank element 26 is achieved by a corresponding contact surface on one steady 48 and on the other side by the contact of the end face 50 of the guide fin 14 with the contact surface 52 which forms the base of the slot 40 in the slide element 38. Alternatively, the contact on the side of the transverse direction of the roof between the crank element 26 and the holding element 16 can also be achieved by the corresponding contact surfaces outside of the slot 40 and the guide fin 14 in the top half of the slide element 38.

The guide fin 14, like the entire crank element 26, and the holding element 16 are preferably made of metal, while the slide element 38 is preferably made of plastic. Preferably, the slide element 38 is injected into the circular receiver of the holding element 16, and by means of a shrinking process, after the slide element 38 is injected suitable play is automatically established between the receiver in the holding element 16 and the slide element 38 such that the connection between them is accurate to provide for a smooth performance. Since the guide fin 14 can be made much thinner than a corresponding guide channel, on the one hand the sensitivity of the guide to tolerances is much less and on the other hand the construction height in the vertical direction of the crank element 26 can be reduced.

As a result of the curvature of the guideway 14 the sliding displacement of the crank element 26 with respect to the holding element 16 causes the crank element 26 and the mounting element 12 to swing out with respect to the mounting element 10. The resulting relative turning is balanced essentially without increasing the friction force between the slide element 38 and the guide fin 14 by turning the slide element 38 in the circular receiver in the holding element 16. In this way, with ease of production a compact, easy and reliable adjustment mechanism insensitive to tolerances for the mounting elements of a louvered roof is formed.

Although an exemplary embodiment of the present invention has been described in detail above, those skilled in the art readily appreciate that many modifications are possible without materially departing form the novel teachings and advantages which are described herein. Accordingly all such modifications are intended to be included within the scope of the present invention.

I claim:

1. A device for adjusting a crank element of an openable motor vehicle roof, said device comprising:
   a guideway adapted to project, in use, substantially perpendicularly from a surface of the crank element;
   a holding element adapted to engage, in use, the crank element in a manner for moving the crank element and the holding element relative to one another along the guideway; and
   a slide element pivotally mounted on the holding element in a manner such that the slide element surrounds the guideway;
   wherein, during operation, the slide element is rotatable with respect to the holding element around an axis which is substantially perpendicular to a substantially vertical plane in which the holding element moves.

2. The device as claimed in claim 1, wherein the holding element includes a substantially circular receiver sized to receive the slide element.

3. The device as claimed in claim 2, wherein the slide element is provided with a slot in which the guideway is guided during operation.

4. The device as claimed in claim 3, wherein the guideway includes two opposing contact surfaces which engage opposing surfaces of the slide element.

5. The device as claimed in claim 4, wherein the contact surfaces of the guideway are essentially planar and substantially parallel to one another.

6. The device as claimed in claim 5, wherein the slot of the slide element is provided with opposing projections which form opposing surfaces for engagement with the contact surfaces of the guideway.

7. The device as claimed in claim 3, wherein the substantially circular receiver of the holding element is provided with a slot which is wider than the slot of the slide element to allow rotation of the slide element within the substantially circular receiver.

8. The device as claimed in claim 3, wherein a bottom surface of the slot of the slide element forms a contact surface for an end face of the guideway.

9. The device as claimed in claim 3, wherein an area outside of the slot of the slide element is opposed to an opposing surface of the holding element.

10. The device as claimed in claim 4, wherein a lower contact surface of the guideway passes into a boundary surface of the crank element to form an L-shaped configuration.

11. The device as claimed in claim 1, wherein the guideway and the holding element are composed of metal.

12. Device as claimed in claim 1, wherein the slide element is composed of plastic.

13. The device as claimed in claim 2, wherein the slide element is made of plastic and has been formed in situ by having been injected into the substantially circular receiver of the holding element.

14. An adjustable crank device of an openable motor vehicle roof, comprising:

a crank element;

a guideway which projects substantially perpendicularly from a surface of the crank element;

a holding element which engages the crank element in a manner for moving the crank element and the holding element relative to one another along the guideway; and a slide element pivotally mounted on the holding element in a manner such that the slide element surrounds the guideway;

wherein, during operation, the slide element is rotatable with respect to the holding element around an axis which is substantially perpendicular to a substantially vertical plane in which the holding element and the crank element move.

15. The device as claimed in claim 14, wherein the holding element includes a substantially circular receiver sized to receive the slide element.

16. The device as claimed in claim 15, wherein the slide element is provided with a slot in which the guideway is guided during operation.

17. The device as claimed in claim 16, wherein the guideway includes two opposing contact surfaces which engage opposing surfaces of the slide element.

18. The device as claimed in claim 17, wherein the contact surfaces of the guideway are essentially planar and substantially parallel to one another.

19. The device as claimed in claim 18, wherein the slot of the slide element is provided with opposing projections which form opposing surfaces for engagement with the contact surfaces of the guideway.

20. The device as claimed in claim 16, wherein the substantially circular receiver of the holding element is provided with a slot which is wider than the slot of the slide element to allow rotation of the slide element within the substantially circular receiver.

21. The device as claimed in claim 16, wherein a bottom surface of the slot of the slide element forms a contact surface for an end face of the guideway.

22. The device as claimed in claim 16, wherein an area outside of the slot of the slide element is opposed to an opposing surface of the holding element.

23. The device as claimed in claim 17, wherein a lower contact surface of the guideway passes into a boundary surface of the crank element to form an L-shaped configuration.

24. The device as claimed in claim 14, wherein the holding element and the crank element are formed on front and rear laterally mounted elements of a louvered roof.

* * * * *